United States Patent
Kim et al.

(10) Patent No.: US 9,588,678 B2
(45) Date of Patent: Mar. 7, 2017

(54) METHOD OF OPERATING ELECTRONIC HANDWRITING AND ELECTRONIC DEVICE FOR SUPPORTING THE SAME

(71) Applicant: Samsung Electronics Co., Ltd., Gyeonggi-do (KR)

(72) Inventors: Hyojin Kim, Gyeongsangbuk-do (KR); Inhyung Jung, Gyeongsangbuk-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/474,016

(22) Filed: Aug. 29, 2014

(65) Prior Publication Data

US 2015/0062043 A1   Mar. 5, 2015

(30) Foreign Application Priority Data

Aug. 29, 2013  (KR) ........................ 10-2013-0103523

(51) Int. Cl.
*G06F 3/041* (2006.01)
*G06F 3/0488* (2013.01)
*G06K 9/00* (2006.01)

(52) U.S. Cl.
CPC ..... *G06F 3/04883* (2013.01); *G06K 9/00416* (2013.01)

(58) Field of Classification Search
CPC .................. G06F 3/041; G06F 3/0488; G06F 2203/04101; G06F 2203/04104; G06F 3/0482; G06F 3/04842; G06F 3/04817; G06F 1/16
See application file for complete search history.

(56) References Cited

U.S. PATENT DOCUMENTS

| | | | |
|---|---|---|---|
| 6,681,044 B1 * | 1/2004 | Ma ........................ | G06K 9/222 382/185 |
| 7,453,439 B1 | 11/2008 | Kushler et al. | |
| 7,925,088 B2 * | 4/2011 | Bhaskarabhatla . | G06K 9/00409 382/179 |
| 2003/0086611 A1 * | 5/2003 | Loudon .................. | G06K 9/342 382/186 |
| 2005/0100218 A1 * | 5/2005 | Guha ..................... | G06K 9/222 382/187 |
| 2010/0039296 A1 * | 2/2010 | Marggraff ........... | G06F 3/03545 341/20 |

FOREIGN PATENT DOCUMENTS

KR   10-1061317   8/2011

* cited by examiner

*Primary Examiner* — Olga Merkoulova

(57) ABSTRACT

A method of operating electronic handwriting includes receiving at least two handwriting strokes from a touch screen, determining whether the at least two handwriting strokes overlap each other, selecting at least one of the overlapped handwriting strokes into a group, and recognizing a handwriting stroke belonging to the group. An electronic device for recognizing handwriting includes at least one of a touch device configured to receive a handwriting strokes, a storage configured to store information comprising the at least one handwriting stroke, and a controller configured to determine whether at least two handwriting strokes overlap each other, select at least one of the overlapped handwriting strokes into a group, and perform text recognition on a handwriting strokes belonging to the group.

17 Claims, 8 Drawing Sheets

METHOD OF OPERATING ELECTRONIC HANDWRITING AND ELECTRONIC DEVICE FOR SUPPORTING THE SAME

CROSS-REFERENCE TO RELATED APPLICATION AND CLAIM OF PRIORITY

The present application is related to and claims the benefit under 35 U.S.C. §119(a) of a Korean patent application No. 10-2013-0103523 filed on Aug. 29, 2013 in the Korean Intellectual Property Office, the entire disclosure of which is hereby incorporated by reference.

TECHNICAL FIELD

Technology described in various embodiments of the present disclosure relates to recognizing handwriting in an electronic device.

BACKGROUND

Many of electronic devices support a text entry function by providing a key map including virtual touch keys having a predetermined text key arrangement. If a user is not accustomed to the predetermined text key arrangement, however, the user may feel difficult in entering text using the key map. Furthermore, there is a problem in that a user may not easily select a desired key because the size of a key map applied to a portable device is small. In order to solve such a problem, there is provided a function capable of directly entering text, for example, an electronic handwriting function. However, a conventional electronic device is problematic in that the recognition of text entered using an electronic handwriting function is not accurate.

SUMMARY

A method of recognizing handwriting includes receive at least two handwriting strokes from a touch screen, determining whether the at least two handwriting strokes overlap each other, selecting at least one of the overlapped handwriting strokes into a group, and recognizing a handwriting stroke belonging to the group.

In some embodiments, the method further includes calculating a mean value of sizes of the handwriting strokes, or a mean value of sizes of text regions containing the handwriting strokes, removing handwriting strokes contained in a text region having a difference greater than a threshold, the difference between the size of the text region and the calculated mean value, and recognizing handwriting strokes contained in remaining text regions.

In some embodiments, the method further includes selecting part of the handwriting strokes and excluding remaining some of the strokes in response to a user input.

In some embodiments, the method further includes defining regions of a size, each comprising information on a point of the handwriting stroke.

In some embodiments, the method further includes removing a handwriting stroke corresponding to a region having an overlap ratio greater than a threshold from the group, the overlap ration between the text regions, and excluding a handwriting stroke corresponding to a region having a greater number of overlapping regions between the text regions than a threshold, from the group.

In some embodiments, selecting at least one of the overlapped handwriting strokes into a group includes calculating a mean value of sizes of the respective strokes or a mean value of sizes of specific regions comprising the respective strokes, selecting strokes, each corresponding to a region having a difference between the size of the selected stroke and the calculated mean value greater than a threshold, into an exclusion candidate group, determining an overlap ratio between the region of each of the strokes selected as the exclusion candidate group and other regions, and excluding a stroke corresponding to a region having a greater overlap ratio in a size than a threshold, from the group.

In some embodiments, selecting the at least some of the overlapping strokes includes calculating a mean value of sizes of the respective strokes or a mean value of sizes of specific regions comprising the respective strokes, selecting strokes, each corresponding to a text region having a difference between the size of the selected stroke and the calculated mean value greater than a first threshold, into an exclusion candidate group, selecting a region that belongs to the strokes selected as the exclusion candidate group and that has a greater overlap ratio in a size between the regions of the selected strokes than a second threshold, into an additional exclusion candidate group, and removing a stroke corresponding a text region that is selected as the additional exclusion candidate group, and has a greater number of overlapping regions between the regions of the selected strokes than a third threshold, from the group.

In some embodiments, the method further includes storing results of the text recognition along with handwriting information corresponding to an image input by the handwriting.

In some embodiments, selecting the at least some of the overlapping strokes includes obtaining time information on when overlapped handwriting strokes are written, and grouping the overlapped handwriting strokes based on the time information.

An electronic device for recognizing handwriting includes at least one of a touch device configured to receive a handwriting strokes, a storage configured to store information comprising the at least one stroke, and a controller configured to determine whether at least two handwriting strokes overlap each other, select at least one of the overlapped handwriting strokes into a group, and perform text recognition on a handwriting strokes belonging to the group.

In some embodiments, the controller is configured to calculate a mean value of sizes of the strokes, or a mean value of sizes of text regions containing the handwriting strokes, remove a handwriting stroke contained in a text region having a difference greater than a threshold, the difference between the size of the text region and the calculated mean value, and recognize handwriting strokes contained in remaining text regions.

In some embodiments, the controller is configured to selecting part of the handwriting strokes in response to a user input, and exclude remaining part of the handwriting strokes.

In some embodiments, the controller is configured to define regions of a specific size, each comprising information on a point of the handwriting strokes.

In some embodiments, the controller is configured to remove a stroke, corresponding to a region having an overlap ratio greater than a threshold between the specific regions, from the specific group, or exclude a handwriting stroke corresponding to a region having a greater number of overlapping regions between the text regions than a threshold, from the specific group.

In some embodiments, the controller is configured to select a text region having a difference between the mean value of the sizes of the regions and the size of the selected text region greater than a threshold, into an exclusion candidate group, and exclude a handwriting stroke corresponding to a text region having a greater overlap ratio between the region of the candidate group and a text region corresponding to the excluded handwriting stroke than a threshold, from the group.

In some embodiments, the controller is configured to select a region having a difference or more between the size of the selected region and the mean value of the sizes of the regions, as an exclusion candidate group, select a region having a predetermined and specific overlap ratio or more between a text region of the candidate group and other regions, as an additional exclusion candidate group, and exclude a handwriting stroke corresponding to a region having a specific number of overlapping regions or more between the region selected as the additional exclusion candidate group and other regions, from the specific group.

In some embodiments, the storage is configured to store results of the text recognition along with handwriting information corresponding to an image input by the handwriting.

In some embodiments, the controller is configured to obtain time information on when overlapped handwriting strokes are written, and group the overlapped handwriting strokes based on the time information.

An electronic device for recognizing handwriting includes a touch screen configured to receive at least two handwriting strokes, and a controller configured to determine whether the at least two handwriting strokes overlap each other, select one of the at least two overlapped handwriting strokes into at least two groups, and recognize each handwriting stroke belonging to respective group.

To address the above-discussed deficiencies, it is a primary object to provide a method and apparatus capable of increasing text recognition accuracy in an electronic handwriting function and minimizing an error in the electronic handwriting function.

One of various embodiments of the present disclosure disclose a method of operating electronic handwriting, including checking that at least some strokes overlap each other in received stroke information, selecting at least some of the overlapping strokes as a specific group, and performing text recognition on the received stroke information based on the selected specific group.

Furthermore, various embodiments of the present disclosure disclose an electronic device supporting an electronic handwriting operation, including at least one of a touch device configured to receive an electronic handwriting input corresponding to at least one stroke and a storage module configured to store information including the at least one stroke and a control module configured to check that at least some strokes overlap each other in the stroke information, select at least some of the overlapping strokes as a specific group, and perform text recognition on the strokes based on the selected specific group.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
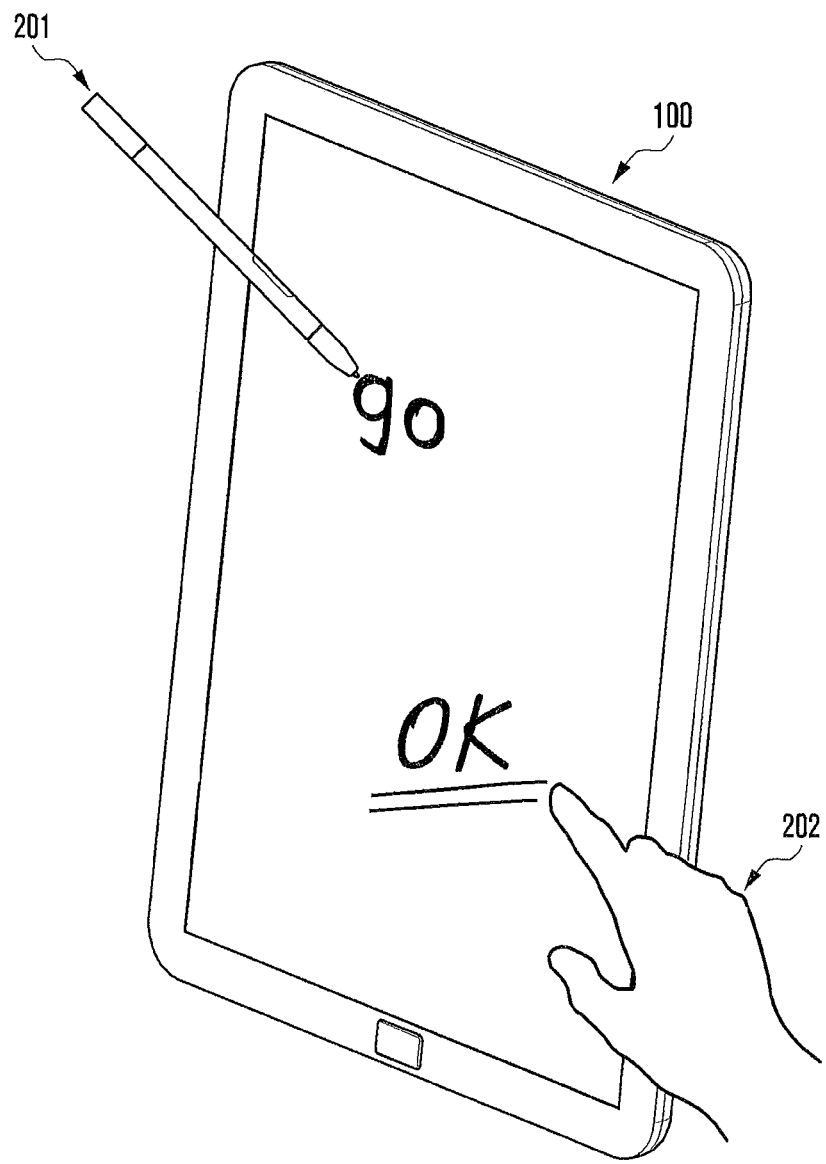
FIG. 1 schematically illustrates an electronic handwriting operation environment.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Hereinafter, embodiments of the present disclosure are described in detail with reference to the accompanying drawings.

In describing the embodiments, a description of contents that are well known in the art to which the present disclosure pertains and not directly related to the present disclosure is omitted. Furthermore, in the drawings, a detailed description of elements having substantially the same construction and function is omitted.

For the same reason, in the accompanying drawings, some elements are enlarged, omitted, or depicted schematically. Furthermore, the size of each element does not accurately reflect its real size. Accordingly, various embodiments of the present disclosure are not restricted by the relative sizes or spaces that are drawn in the figures.

An electronic device in accordance with various embodiments of the present disclosure may be a device including a communication function. Such an electronic device may be one of various devices, for example, a smart phone, a tablet Personal Computer (PC), a mobile phone, a video telephone, an e-book reader, a desktop PC), a laptop PC, a netbook computer, a Personal Digital Assistant (PDA), a Portable Multimedia Player (PMP), an MP3 player, a mobile medical device, an electronic bracelet, an electronic necklace, an electronic accessory, a camera, a wearable device, an electronic clock, a wrist watch, a smart white appliance (e.g., a refrigerator, an air conditioner, a cleaner, an artificial intelligent robot, TV, a Digital Video Disk (DVD) player, an audio, an oven, a microwave, a washing machine, an air cleaner, or an electronic frame), various medical devices (e.g., Magnetic Resonance Angiography (MRA) equipment, Magnetic Resonance Imaging (MRI) equipment, Computed Tomography (CT) equipment, a photographer, and an ultrasonic device), a navigator, a Global Positioning System (GPS) receiver, an Event Data Recorder (EDR), a Flight Data Recorder (FDR), a set-top box, a TV box (e.g., Samsung HomeSync™, Apple TV™, or Google TV™), an electronic dictionary, a vehicle infotainment device, electronic equipment for ship (e.g., a navigator for ship or a gyrocompass), avionics, a security device, an electronic cloth, an electronic key, a camcorder, a game console, a Head Mounted Display (HMD), a flat panel display device, an electronic album, part of furniture or a building/structure including a communication function, an electronic board, an electronic signature receiving device, and a projector or a combination of one or more of the various devices. It is evident to those skilled in the art that the electronic device according to the present disclosure is not limited to the aforementioned devices.

FIG. 1 is a diagram schematically showing an electronic handwriting operation environment.

Referring to FIG. 1, an electronic handwriting operation environment can include the electronic device 100 and handwriting means 201 and 202.

In such an electronic handwriting operation environment, the electronic device 100 recognizes input through the handwriting means 201, 202 and receives an image input in the state in which the electronic device 100 having an electronic handwriting function maintains the electronic handwriting function.

The electronic device 100 recognizes the input image. If, as a result of the recognition, the input image complies with predetermined and specific text, the electronic device 100 can recognize the input image as text. In this process, if, as a result of the recognition, the input image does not comply with predetermined and specific text, the electronic device 100 may not recognize the input image as text. In this case, the text can include points and strokes having a predetermined shape, such as a letter, a number, a special character, and a symbol. The electronic device 100 can define a specific region, for example, a text region including some points and strokes in a process of recognizing the input image as text. For example, the electronic device 100 can define a unit region including some points and strokes. The electronic device 100 can process the overlapping of the text regions in the text recognition process.

In accordance with an embodiment, if input images overlap with each other, the electronic device 100 can check the overlap of text regions that can be recognized as text based on information about the points and strokes of the overlapping input images, and can separate overlap images. For example, the electronic device 100 can separately recognize the overlapped texts as different pieces of text, or can exclude any one of the overlapping text regions and perform text recognition on the remaining text regions. Alternatively, the electronic device 100 can additionally perform text recognition on the excluded text region. The electronic device 100 can include the results of the text recognition in corresponding handwriting information and store them. When a handwriting information search is requested, the electronic device 100 can search for handwriting information including corresponding text based on stored recognition results, and can output the results of the search.

The handwriting means 201, 202 can include various devices or tools, such as an electronic pen 201 and a finger 202. The handwriting means 201, 202 can be diversified depending on devices related to the electronic handwriting function of the electronic device 100. For example, with reference to the handwriting function support of the electronic pen 201, the electronic device 100 can include a touch panel or a touch sheet that adopts at least one of various sensors, such as a capacitive type touch sensor, an electromagnetic induction type touch sensor, and a resistive type touch sensor. With reference to the handwriting function support of the finger 202, the electronic device 100 can include a touch panel or a touch sheet that adopts a capacitive type touch sensor or a resistive type touch sensor. In electronic handwriting operation environments in accordance with various embodiments of the present disclosure, the handwriting means 201 and 202 are not limited to the electronic pen 201 and the finger 202. For example, the handwriting means 201 and 202 can include various tools, such as a graphite pencil, a stick, and a gloved hand. In various embodiments of the present disclosure, it should be understood that the handwriting means 201 and 202 are tools capable of performing handwriting input on the display module of the electronic device 100.

Figure 2:
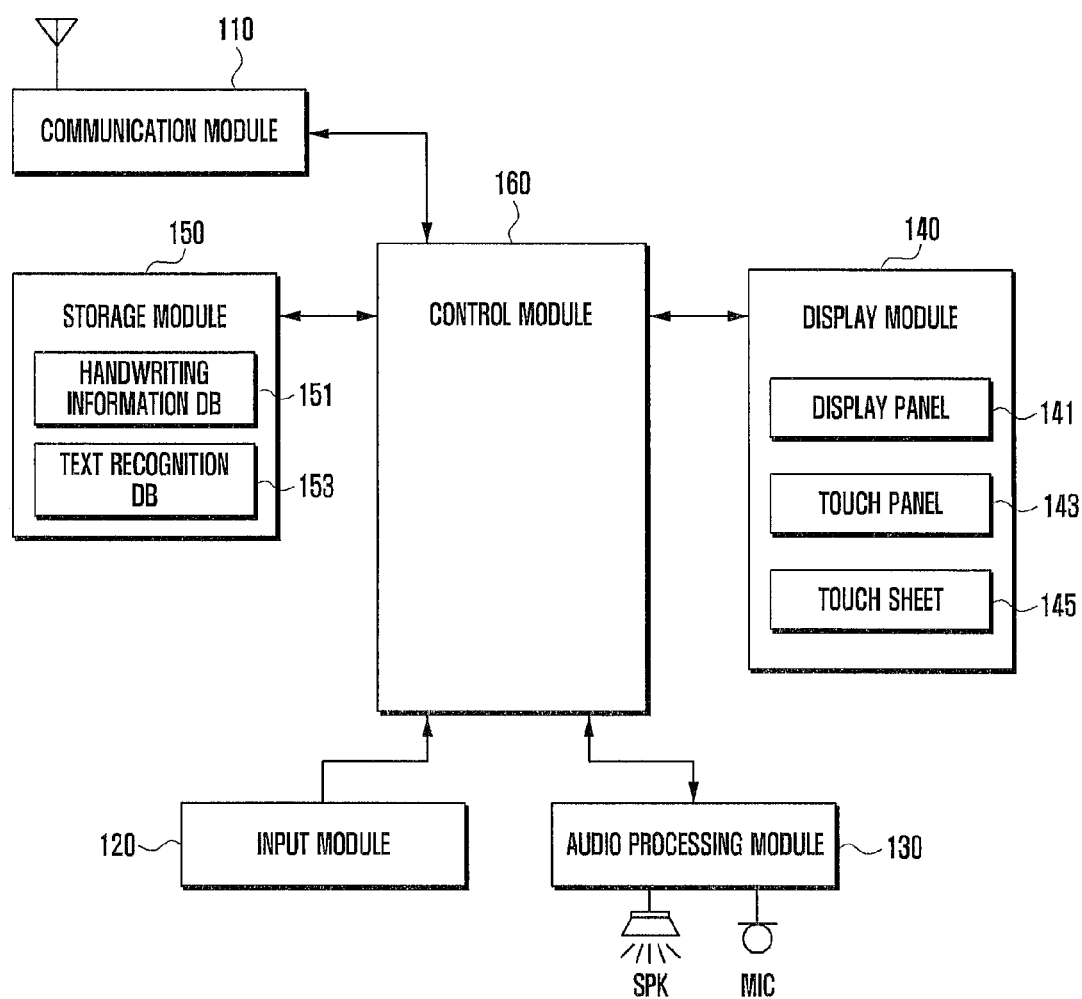
FIG. 2 illustrates the construction of an electronic device which supports an electronic handwriting operation environment in accordance with an embodiment of the present disclosure.

FIG. 2 is a diagram showing the construction of the electronic device which supports an electronic handwriting operation environment in accordance with an embodiment of the present disclosure.

Referring to FIG. 2, the electronic device 100 applied to various embodiments of the present disclosure can include a communication module 110, an input module 120, an audio processing module 130, a display module 140, a storage module 150, and a control module 160.

The electronic device 100 having the above construction can support an electronic handwriting function based on the display module 140 having a touch function. In accordance with an embodiment, the electronic device 100 can check an event input in an electronic handwriting function process, for example, the overlap of strokes related to the electronic handwriting function, and can differently perform text recognition depending on an overlap ratio. For example, if a plurality of strokes overlap with one another, the electronic device 100 can exclude specific strokes from the plurality of strokes based on an overlap ratio in a text recognition process, and can perform text recognition on only the remaining strokes. In accordance with another embodiment, if a plurality of strokes overlaps with one another, the electronic device 100 can separate overlapping strokes and perform text recognition on the separated regions. The electronic device 100 in accordance with an embodiment of the present disclosure can minimize an error of text recognition that can occur due to the overlapping of strokes, and can improve the accuracy of text recognition. Furthermore, the electronic device 100 of the present disclosure can perform information search for pieces of handwriting information more rapidly because it connects the results of text recognition to corresponding handwriting information and stores the handwriting information.

The communication module 110 can support the communication function of the electronic device 100. If the electronic device 100 does not support the communication function, the communication module 110 can be omitted from the configuration of the electronic device 100. If the electronic device 100 has mobility, the communication module 110 can support a wireless cell network. Alternatively, the communication module 110 can be capable of forming a short-range communication channel. In accordance with an embodiment, the communication module 110 can send handwriting information, written using an electronic handwriting function, to another electronic device. In this process, the transmitted handwriting information can include the results of text recognition to which the overlap text recognition function of the present disclosure has been applied. The overlap text recognition function can be a text recognition function to which processing on overlapping strokes has been applied. In accordance with another embodiment, the communication module 110 can receive handwriting information from another electronic device. The control module 160 can apply the overlap text recognition function of the present disclosure to the received handwriting information, and can perform control so that the results of the application are connected and stored.

The input module 120 can generate a signal related to the operation of the electronic device 100. The input module 120 can include physical hardware keys, such as at least one key button, at least one side key, a home key, at least one menu key, and a power key. The input module 120 can further include a touch pad. If the display module 140 is provided in a touch screen form that supports an input function, the display module 140 can function as the input module 120. In accordance with various embodiments, the input module 120 can generate an input signal related to an electronic handwriting function, a handwriting input signal, and a handwriting information storage input signal in response to user control. The electronic handwriting function can include various functions, such as a memo-writing function, a message-writing function, an e-mail-writing function, a document-writing function, and a function of inputting a telephone number or a name when making a call. The handwriting input signal can correspond to a stroke that is input to the display module 140 having a touch function using the handwriting means 201, 202. In accordance with an embodiment, the input module 120 can generate an input signal related to search for stored handwriting information, an input signal related to the confirmation of retrieved handwriting information, etc. in response to user control. The generated input signal can be transferred to the control module 160.

The audio processing module 130 can process an audio signal generated by the operation of the electronic device 100. For example, the audio processing module 130 can output an audio signal generated by a process of playing back a specific audio file stored in the electronic device 100, or can output an audio signal received from another electronic device. In accordance with various embodiments, the audio processing module 130 can output a guidance sound or sound effect related to the electronic handwriting function of the electronic device 100. The audio processing module 130 can output a guidance sound or sound effect corresponding to a handwriting input signal, for example, a stroke input. The function of outputting the guidance sound or sound effect can be omitted in response to user configurations or design methods.

The display module 140 can output a screen related to the operation of the electronic device 100. For example, the display module 140 can provide a standby screen, a menu screen, an icon screen, and a specific content output screen. If the display module 140 is provided in a touch screen form, it can operate as an input device. The display module 140 can include a display panel 141, a touch panel 143, and a touch sheet 145. The display panel 141 can output a screen related to the execution of a function. The touch panel 143 and the touch sheet 145 can generate a touch event for the handwriting means 201, 202 that is touched or approached within a specific distance. For example, the touch panel 143 can be implemented in a capacitive type or a resistive type. The touch panel 143 can detect a finger touch or the touch or approach of a capacitive type electronic pen. The touch sheet 145 can detect the touch or approach of an electromagnetic induction type electronic pen. In an embodiment of the present disclosure, the display module 140 includes the touch panel 143 and the touch sheet 145, as illustrated in FIG. 2, but the scope of the present disclosure is not limited thereto. For example, the display module 140 can be configured to include only the display panel 141 and the touch panel 143. Alternatively, the display module 140 can be configured to include only the display panel 141 and the touch sheet 145. The display module 140 can support a finger touch, an electronic pen touch, or a common pen touch. The display module 140 can include a plurality of touch panels or touch sheets.

The display module 140 can output a screen related to an electronic handwriting function. For example, the display module 140 can output a region related to an electronic handwriting function to a memo-writing screen, a message-writing screen, an e-mail-writing screen, a document-writing screen, and various screens related to the input of numbers or text. A stroke can be entered on the touch panel 143, and a stroke input track can be displayed on the display module 140. When text recognition is performed on the entered stroke, the display module 140 can output the results of the text recognition. For example, the display module 140 can display the state of text recognition of a specific stroke. In this process, if strokes overlap with one another, the display module 140 can output results according to the exclusion recognition or separation recognition of overlapping strokes automatically or in response to a request from a user.

The display module 140 can output at least one candidate group or candidate list of recognized strokes with reference to a stroke exclusion function. The control module 160 can perform control in response to an input signal for selecting at least one candidate so that a stroke corresponding to the input signal is excluded. The display module 140 can exclude a candidate group or candidate list, displayed when an input signal corresponding to the selection of at least one candidate is generated, from a screen. The display module 140 can provide a screen on which excluded strokes are searched for. The electronic device 100 can store at least one of the results of text recognition from which at least some of overlapping strokes have been excluded and the results of text recognition performed on at least one excluded stroke of the overlapping strokes. When a search request for excluded strokes is generated, the display module 140 can provide a screen on which excluded strokes are searched for based on the results of text recognition performed on stored exclusion strokes. Furthermore, in accordance with various embodiments, the display module 140 can output at least one of the results of text recognition performed on strokes to which exclusion has been applied, the results of text recognition performed on excluded strokes, and information about overlapping strokes prior to the exclusion of strokes, in response to a stroke search request.

The display module 140 can provide a handwriting information search screen. The handwriting information search screen can include a search word entry region and a region in which handwriting information items related to an entered search word are output. When specific handwriting information among handwriting information items is selected, the display module 140 can output the selected specific handwriting information to the entire screen. In a process of storing a stroke input, the control module 160 can perform processing on pieces of overlapping information, and can perform control so that the pieces of processed overlapping information are stored in an index database (DB). For example, the control module 160 can exclude at least some of overlapped strokes and execute text recognition. The control module 160 can perform text recognition on strokes that have been removed of overlapped portion of the strokes. The control module 160 can store strokes on which text recognition has been performed in the index DB. When a search word related to a stroke search is entered, the control module 160 can perform control with reference to the index DB so that the search results of text-recognized strokes corresponding to the search word are output to the display module 140. In accordance with an embodiment, when a search word related to a stroke search is entered, the display module 140 can output stroke information about overlapped strokes corresponding to the search word. In accordance with another embodiment, the display module 140 can output an input window for a stroke input with reference to a stroke search. When a stroke is entered on the input window, text recognition corresponding to the stroke is performed, and the results of the text recognition can be applied to a search word. The storage module 150 can store data and a program related to the operation of the electronic device 100. For example, the storage module 150 can store an operating system and at least one application software (app). The operating system can perform signal processing on control of at least one app process. The at least one app can be a program corresponding to user functions provided by the electronic device 100. The at least one app can include a communication function app. The communication function app can include a call function app, a message service app, and a data communication app, such as a video call or web access.

In accordance with an embodiment, the storage module 150 can include the text recognition DB 153 and an electronic handwriting function app.

The text recognition DB 153 can provide a text recognition function based on entered strokes in response to user handwriting. The text recognition DB 153 can include information about the points and disposition of strokes. The text recognition DB 153 can further include information about a syllable according to a combination of at least one stroke. The text recognition DB 153 can further include information about a word according to a combination of at least one syllable. The text recognition DB 153 can further include information about a complex word, a phase, or a sentence according to a combination of at least one word. As described above, the text recognition DB 153 can include information about a predetermined letter, number, special character, symbol, etc. so that an image input in a handwriting form is recognized as text.

The electronic handwriting function app can support a handwriting input function. The electronic handwriting function app can support the output of a screen including a handwriting input region. The electronic handwriting function app can store entered strokes in an image form. The electronic handwriting function app can support a text recognition function for entered strokes. In accordance with an embodiment, the electronic handwriting function app of the present disclosure can support an overlap text recognition function. As described above, the overlap text recognition function can be a text recognition function according to processing on overlapping strokes.

The electronic handwriting function app can support a stroke search function. When the electronic handwriting function app is activated, a search window or a stroke entry window for a stroke search can be displayed. When a specific search word or a search word corresponding to a stroke input is collected, the electronic device 100 can output information on strokes that belong to pieces of previously stored stroke information and that correspond to a currently entered search word or that are related to the search word to the display module 140. In this process, the electronic handwriting function app can perform text recognition on the pieces of stored stroke information. If overlapped strokes are present in specific stroke information, the electronic handwriting function app can remove at least some of the overlapped strokes and can perform text recognition. If stroke information including overlapped strokes corresponding to an entered search word is present, the electronic handwriting function app can output information about the strokes having the overlap state to the display module 140. In accordance with an embodiment, the electronic handwriting function app can output at least one of information about strokes having the overlap state, information on strokes from which an overlap part has been excluded, and information about excluded strokes to the display module 140.

In accordance with various embodiments, the storage module 150 can include a handwriting information DB 151 and a handwriting information search app.

The handwriting information DB 151 can store handwriting information that is generated when the electronic handwriting function app operates. Pieces of handwriting information stored in the handwriting information DB 151 can include results recognized by an overlap text recognition function according to the present disclosure. For example, if overlapping strokes are present in handwriting information, the handwriting information can include the results of recognition corresponding to the execution of the overlap text recognition function and information related to stroke recognition exclusion, such as time data related to a stroke input time. The handwriting information DB 151 can store handwriting information received from another electronic device. If the overlap text recognition function is not applied to handwriting information received from another electronic device, the overlap text recognition function can be applied to the handwriting information under the control of the control module 160. The received handwriting information can include the results of recognition corresponding to the execution of the overlap text recognition function, and can be stored in the handwriting information DB 151.

The handwriting information search app can be provided on the display module 140 in a separate menu item or icon. Alternatively, the handwriting information search app can be applied in the form of a single routine that belongs to the search app functions of the electronic device 100. For example, when a search word is entered in a process of executing a search app, the electronic device 100 can output search results corresponding to the search word. In this case, the execution results of the search app can include not only pieces of specific information corresponding to the search word, but handwriting information search results. When a search word is entered, the handwriting information search app can fetch the handwriting information DB 151, and can search for handwriting information related to the entered search word. In this case, the handwriting information search app can perform a task for mapping the results of text recognition, stored along with the handwriting information, to the search word, and can detect related handwriting information. The handwriting information search app can support the output of the stroke entry window. When a stroke is entered on the stroke entry window, the handwriting information search app can perform text recognition based on the text recognition DB 153. The handwriting information search app can perform search writing using the results of text recognition as a search word. The control module 160 can control the processing and transfer of a control signal and the transfer and processing of data that are related to the operation of the electronic device 100. In accordance with various embodiments, the control module 160 can perform control so that an icon or menu item related to the electronic handwriting function and an icon or menu item related to the handwriting information search function are output to the display module 140. When the icon or menu item is selected, the control module 160 can activate the electronic handwriting function or the handwriting information search function in response to the activated item. The control module 160 can apply the overlap text recognition function in an electronic handwriting function process. Furthermore, the control module 160 can control the application of the overlap text recognition function to the received handwriting information externally.

Figure 3:
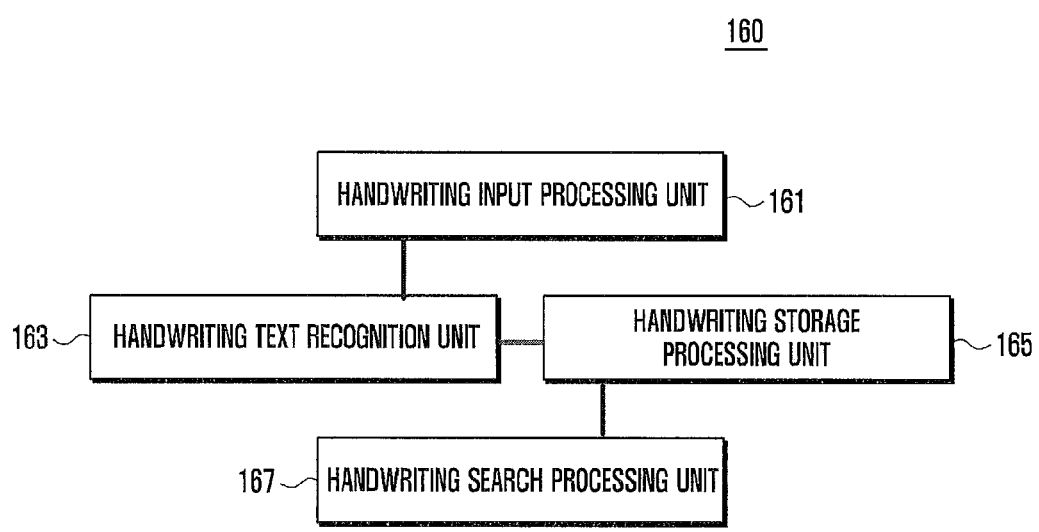
FIG. 3 illustrates the construction of a control module in accordance with an embodiment of the present disclosure.

FIG. 3 is a diagram showing the construction of a control module in accordance with an embodiment of the present disclosure.

Referring to FIG. 3, the control module 160 of the present disclosure can include a handwriting input processing unit 161, a handwriting text recognition unit 163, a handwriting storage processing unit 165, and a handwriting search processing unit 167.

The handwriting input processing unit 161 can control the execution of the electronic handwriting function app. For example, when an event related to the activation of the electronic handwriting function is generated, the handwriting input processing unit 161 can perform control so that a screen on which the electronic handwriting function can be performed is output to the display module 140. In this process, if the electronic device 100 supports various touch inputs, the handwriting input processing unit 161 can control the activation of a device corresponding to a request, for example, the activation of at least one of the touch panel 143 and the touch sheet 145.

The handwriting input processing unit 161 can receive an event according to the approach or contact of handwriting means, for example, an electronic pen or a finger in the activation state of at least one of the touch panel 143 and the touch sheet 145. The handwriting input processing unit 161 can process a stroke input according to the event. For example, the handwriting input processing unit 161 can perform control so that an image corresponding to a stroke is output to the display panel 141. The handwriting input processing unit 161 can control the real-time output of an image in response to an entered stroke.

The handwriting text recognition unit 163 can perform text recognition in response to at least one entered stroke. The handwriting text recognition unit 163 can normalize a stroke based on information about the point and disposition of the stroke. The handwriting text recognition unit 163 can detect text, corresponding to at least one normalized stroke, in the text recognition DB 153. The handwriting text recognition unit 163 can transfer the results of recognition to the handwriting storage processing unit 165. The handwriting text recognition unit 163 can perform text recognition on stroke information stored in the storage module 150. For example, when a stroke input is received from the touch panel 141, the handwriting text recognition unit 163 can first transfer the stroke input to the handwriting storage processing unit 165 temporarily or by default. The handwriting text recognition unit 163 can perform text recognition on pieces of stroke information stored in the handwriting storage processing unit 165. Alternatively, when a storage request for stroke information is generated, the handwriting text recognition unit 163 can perform text recognition on pieces of stroke information that have been temporarily stored. When a storage cancellation request for stroke information that has been stored temporarily or by default is generated or when a separate storage request is not generated, the handwriting text recognition unit 163 may not perform text recognition on the stroke information, and can perform control so that the stroke information stored temporarily or by default is deleted. The handwriting text recognition unit 163 can perform the overlap text recognition function in a text recognition process. In accordance with an embodiment, if a plurality of strokes overlaps with one another, the handwriting text recognition unit 163 can exclude at least some of the overlapping strokes in a text recognition process, and can perform text recognition on the remaining strokes. For example, the handwriting text recognition unit 163 can define the text region of each of a plurality of strokes disposed in a specific region. The text region can be defined based on pieces of point information included in a stroke. The handwriting text recognition unit 163 can calculate the mean value of text regions. The handwriting text recognition unit 163 can exclude a stroke that has a text region having a difference of a predetermined and specific value or more based on the mean value in a text recognition process. The handwriting text recognition unit 163 can perform text recognition on the strokes of the remaining text regions.

In accordance with various embodiments, in a handwriting process, an overlapping ratio of a stroke, including a text region of a specific size or more, to a text region of the specific size can be relatively small. When considering an environment in which text is consecutively entered, a probability that strokes including a text region of a specific size can be text that needs to be actually recognized can be relatively higher than a probability that the strokes including a text region of a specific size may not be the text that needs to be actually recognized. Accordingly, the handwriting text recognition unit 163 can exclude a stroke, including a text region that belongs to a plurality of text regions and that has an overlap ratio of a predetermined and specific degree or less with other text regions, in a text recognition process. The handwriting text recognition unit 163 can perform text recognition on a stroke including a text region whose overlapping ratio with other text regions is relatively great. In accordance with an embodiment, the handwriting text recognition unit 163 can recognize stroke information stored in the storage module 150 in response to the completion of input of consecutively entered strokes. In this process, the handwriting text recognition unit 163 can check whether or not an overlap region is present in the stored stroke information, and can perform stroke exclusion in accordance with a rule, such as that described above, if, as a result of the check, an overlap region is found to be present in the stored stroke information. In accordance with various embodiments, the handwriting text recognition unit 163 can exclude a stroke, including a text region that belongs to a plurality of text regions and that has a plurality of degrees of overlapping with other text regions, in a text recognition process. For example, if a specific text region overlaps with a plurality of text regions, the handwriting text recognition unit 163 can exclude a stroke including the specific text region in a text recognition process. The handwriting text recognition unit 163 can perform text recognition on a stroke including text regions whose number of overlaps with other text regions is a specific number or less.

In accordance with another embodiment, if strokes overlap with one another, the handwriting text recognition unit 163 can separate the overlapping strokes and perform text recognition one each of separated text regions. For example, the handwriting text recognition unit 163 can remove at least one of pieces of overlapping text with reference to overlapping text regions, and can perform text recognition on the remaining text regions. In this process, the handwriting text recognition unit 163 can perform the removal of other text regions and text recognition on the remaining text regions with reference to all the overlapping text regions. The handwriting text recognition unit 163 can arrange pieces of recognized text through the process, and can determine various words generated by the text arrangement to be a specific word or text based on the text recognition DB 153. The handwriting text recognition unit 163 can increase accuracy in the results of recognition using information about the time when a stroke is entered. For example, if the other word overlapping with one word is written in the state in which one word has been written and a specific interval has occurred, the handwriting text recognition unit 163 can separately recognize the words written before and after the time when the interval was generated. Accordingly, in a process of excluding a text region, the handwriting text recognition unit 163 can first exclude a text region, corresponding to strokes written after the interval occurrence time, with reference to the recognition of a text region corresponding to strokes written prior to the interval occurrence time. Alternatively, the handwriting text recognition unit 163 can exclude text regions corresponding to strokes written prior to an interval with reference to the recognition of a text region corresponding to strokes written after the interval.

The handwriting storage processing unit 165 can connect handwriting information, formed of an image input by the handwriting input processing unit 161, with the results of text recognition processed by the handwriting text recognition unit 163, and can store the connected results in the handwriting information DB 151. The handwriting storage processing unit 165 can form the handwriting information and the results of text recognition into a single page or different pages, and can store the single page or different pages. The handwriting storage processing unit 165 can generate a handwriting information item with reference to a handwriting information search. The handwriting information item can have a thumbnail form. The handwriting information item can be obtained by automatically extracting at least some of the results of text recognition and defining the file name of corresponding handwriting information based on the extracted results.

In accordance with an embodiment, the handwriting storage processing unit 165 of the present disclosure can support the stroke text recognition and search functions for a memo function. For example, when a stroke input state using the electronic pen or the stylus pen or a stroke input state using the finger is generated, the electronic device 100 can automatically activate the memo function. Alternatively, the electronic device 100 can activate the memo function in response to the selection of a menu or an icon. When a stroke input is generated in the state in which the memo function has been activated, the handwriting storage processing unit 165 can form handwriting information and the results of text recognition into a single memo or different memos and store the single memo or different memos. When the activation of a handwriting information search app is requested, the handwriting storage processing unit 165 can perform a stroke search based on stored memos.

In accordance with another embodiment, when handwriting information is received externally, the handwriting storage processing unit 165 can store the received handwriting information in the handwriting information DB 151. In this process, the handwriting storage processing unit 165 can check whether or not the results of text recognition are included in the handwriting information. If, as a result of the check, the results of text recognition are found to be not included in the handwriting information, the handwriting storage processing unit 165 can provide the handwriting information to the handwriting text recognition unit 163, and can perform control so that the results of the text recognition are connected with the handwriting information and stored.

The handwriting search processing unit 167 can support a handwriting information search. When an event that requests a handwriting search or a common search is generated, the handwriting search processing unit 167 can perform control so that a screen related to the entry of a search word is output. When a search word is entered, the handwriting search processing unit 167 can search for handwriting information corresponding to the search word, and can perform control so that the results of the search are output. In this process, the handwriting search processing unit 167 can map the results of text recognition, stored in the handwriting information DB 151, to the search word and vice versa, and can detect related handwriting information.

In the above description, the handwriting text recognition unit 163 has been illustrated as performing text recognition and storing the results of the text recognition along with handwriting information before storing the handwriting information, but various embodiments of the present disclosure are not limited thereto. For example, the text recognition function of the handwriting text recognition unit 163 can be performed when the handwriting search function of the handwriting search processing unit 167 is performed. In accordance with an embodiment, the handwriting text recognition unit 163 can provide a memo search function as the text recognition function. In accordance with another embodiment, when input corresponding to the selection of the memo search function is generated in the state in which the memo function has been activated, the handwriting text recognition unit 163 can provide the memo search function. In this process, the handwriting text recognition unit 163 can provide a search word input window or a stroke entry window for a memo search. When a search word is entered, the handwriting search processing unit 167 can transfer the entered search word to the handwriting text recognition unit 163.

The handwriting text recognition unit 163 can search for handwriting information in which text corresponding to a search word has been entered in a handwriting form. In this process, the handwriting text recognition unit 163 can perform text recognition on information about the strokes of stored memos. If an overlapping region is presented in the stroke information, the handwriting text recognition unit 163 can recognize text from which some strokes have been excluded and perform text recognition on the excluded strokes in accordance with the aforementioned rule, and can detect the results of the text recognition as handwriting information. When handwriting information corresponding to a search word is detected, the handwriting text recognition unit 163 can transfer the detected handwriting information to the handwriting search processing unit 167. The handwriting search processing unit 167 can compare the handwriting information provided by the handwriting text recognition unit 163 with the search word, and can perform control so that at least one of information about the strokes of text that is identical with or related to the search word and the results of text recognition is output to the display module 140. If the design is performed in accordance with the aforementioned routine, the handwriting information DB 151 may not store the results of the text recognition and the handwriting information together. The electronic device 100 can perform control so that a stroke is not separately recognized when a stroke input is generated, but the stroke is stored in the storage module 150 by default. Furthermore, when a stroke search is requested, the electronic device 100 can perform text recognition on a stroke and then perform a recognition process. In accordance with another embodiment, when the results of text recognition are performed on a stroke, the electronic device 100 can map the results of the text recognition to handwriting information and store the handwriting information. In accordance with various embodiments, the electronic device 100 can recognize stroke inputs, stored without performing text recognition on the stroke inputs, on a predetermined and specific time or on a specific time determined by the control module 160. For example, the electronic device 100 can check a device use history, and can perform text recognition on handwriting information in a time zone in which the device is not used, for example, on a specific time at dawn. Alternatively, the electronic device 100 can perform text recognition on handwriting information on a specific time stored by the control module 160, for example, in a specific cycle. In this case, if a handwriting information search is requested before performing text recognition in a specific cycle or on a specific time zone, the electronic device 100 can perform text recognition at a point of time at which the handwriting information search was requested.

As described above, the electronic device 100 according to various embodiments of the present disclosure can define at least some of the overlapping region of strokes as a specific candidate group or a specific group in order to process the overlapping region for the purpose of text recognition. The electronic device 100 can exclude the defined specific candidate group or specific group in a text recognition process, or can perform text recognition on the defined specific candidate group or specific group. In response thereto, the electronic device 100 of the present disclosure can include at least one of a touch device configured to receive an electronic handwriting input corresponding to at least one stroke and a storage module configured to store information including at least one stroke and a control module configured to check the overlap of at least some stokes, select at least some of the overlapping strokes as some groups, and perform text recognition on strokes based on the selected some groups. In this case, the touch device can be at least one of the touch panel and the touch sheet as described above. Furthermore, the electronic device 100 of the present disclosure can exclude at least some of pieces of information about overlapping strokes from a specific group and perform text recognition, or can perform text recognition on excluded stroke information. Furthermore, the electronic device 100 of the present disclosure can store or output at least some of the results of text recognition to which exclusion has been applied and the results of text recognition performed on excluded strokes.

Figure 4:
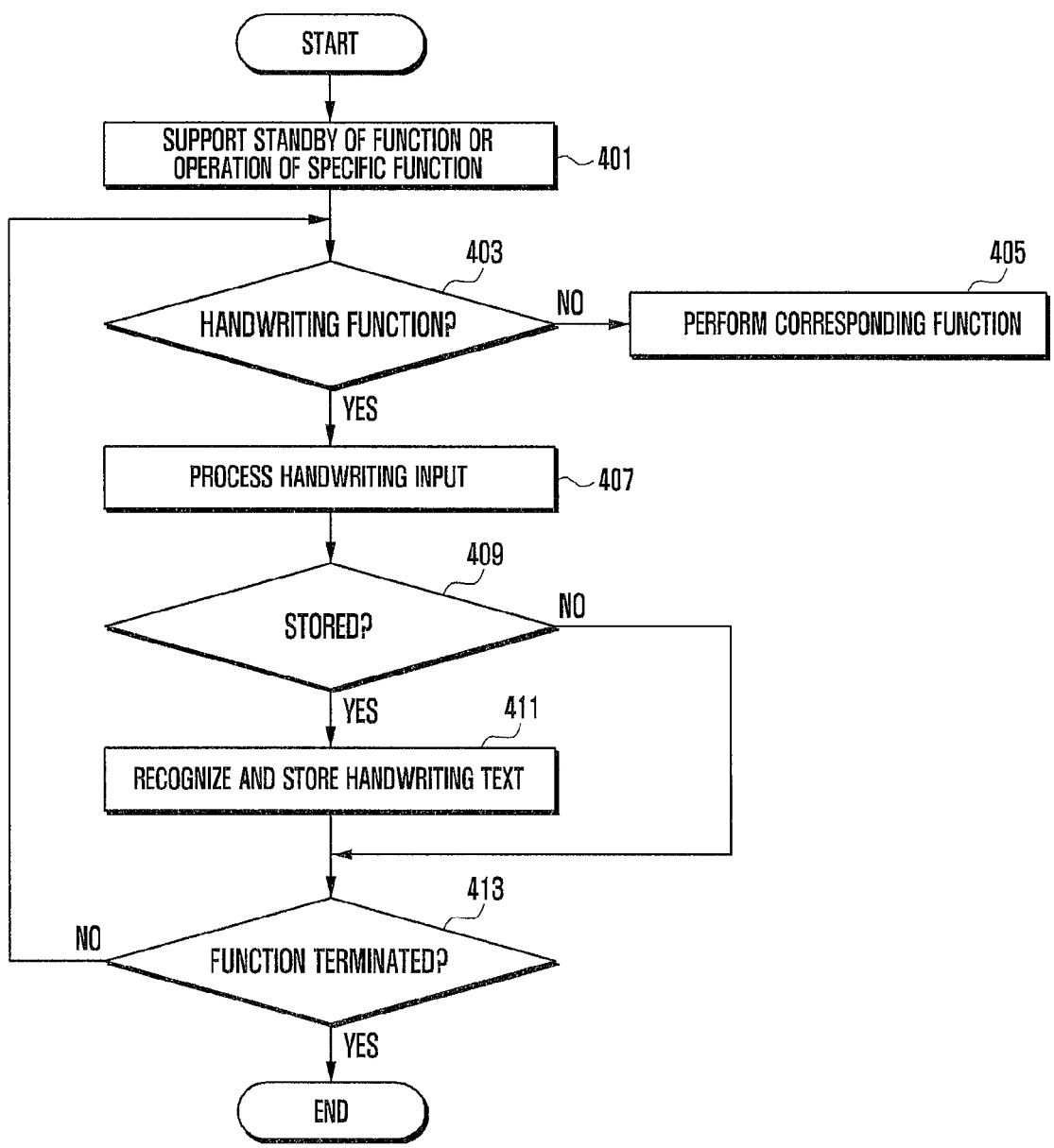
FIG. 4 illustrates a method of operating electronic handwriting in accordance with an embodiment of the present disclosure.

FIG. 4 is a diagram illustrating a method of operating electronic handwriting in accordance with an embodiment of the present disclosure.

Referring to FIG. 4, in the method of operating electronic handwriting in accordance with an embodiment of the present disclosure, the control module 160 can support the standby of a function or the operation of a specific function at operation 401. For example, the control module 160 can support sleep mode related to the turn-off state of the display module 140. The control module 160 can control a file playback function, a file search function, etc. in response to user control. The control module 160 can control the output of a touch key map, including virtual text keys of a predetermined form, with reference to a memo function, an e-mail function, and a document-writing function.

When a specific event is generated at operation 403, the control module 160 can check whether or not the event is an event that requests the operation of a handwriting function. If, as a result of the check at operation 403, the event is found to be not an event that requests the operation of a handwriting function, the control module 160 can control the execution of a function corresponding to the event at operation 405. For example, the control module 160 can perform control so that a function that has been performed continues to be performed. In accordance with an embodiment, the control module 160 can control a file playback function in accordance with the type of event, or can support control of an image collection function, a call function, or a web surfing function.

If, as a result of the check at operation 403, the event is found to be an event that requests the operation of a handwriting function, the control module 160 can control handwriting input processing, for example, at operation 407. For example, the control module 160 can activate the display module 140, and can collect an event according to the approach or contact of the handwriting means. The control module 160 can perform control so that an image corresponding to the collected event is output to the display module 140. In this process, the control module 160 can perform control so that an image according to the point information and track of the event is output in real time.

At operation 409, for example, the control module 160 can check whether or not an event related to the storage of handwriting information has occurred. If, as a result of the check at operation 409, an event related to the storage of handwriting information is found to have not occurred, the control module 160 can skip operation 411. In contrast, if, as a result of the check at operation 409, an event related to the storage of handwriting information is found to have occurred, the control module 160 can perform control so that handwriting text is recognized and stored at operation 411. For example, the control module 160 can perform text recognition by applying the overlap text recognition function to drawn mages. In accordance with an embodiment, the control module 160 can define strokes, included in images, as text regions, can exclude at least one overlapping text region, and can perform text recognition on the remaining text regions. In accordance with another embodiment, the control module 160 can separately perform text recognition on overlapping text regions.

At operation 413, for example, the control module 160 can check whether or not an event related to the function end of the electronic device 100 has occurred. If, as a result of the check at operation 413, an event related to the function end of the electronic device 100 is found to have not occurred, the control module 160 can branch to operation 403 in which the control module 160 can perform control so that subsequent processes are performed again. If, as a result of the check at operation 413, an event related to the function end of the electronic device 100 is found to have occurred, the control module 160 can perform control so that the handwriting function of the electronic device 100 is terminated.

In the above description, the text recognition function has been illustrated as being executed when an event related to the storage of handwriting information is generated, but various embodiments of the present disclosure is not limited thereto. For example, the control module 160 can perform text recognition in real time while an input event is generated. In another embodiment, if an input event is not generated for a specific time, the control module 160 can perform text recognition on images which belong to images according to a previous input event and on which text recognition has not been performed. Alternatively, the control module 160 can perform text recognition on images, output to the display module 140, in a predetermined and specific cycle. The control module 160 can automatically store the results of recognition performed by the text recognition function. When an event related to the storage of handwriting information is generated, the control module 160 can perform control so that the results of text recognition that have been temporarily stored are connected to the handwriting information and stored. If the storage of handwriting information is not requested, the control module 160 can perform control so that the results of text recognition that have been temporarily stored are deleted.

Figure 5:
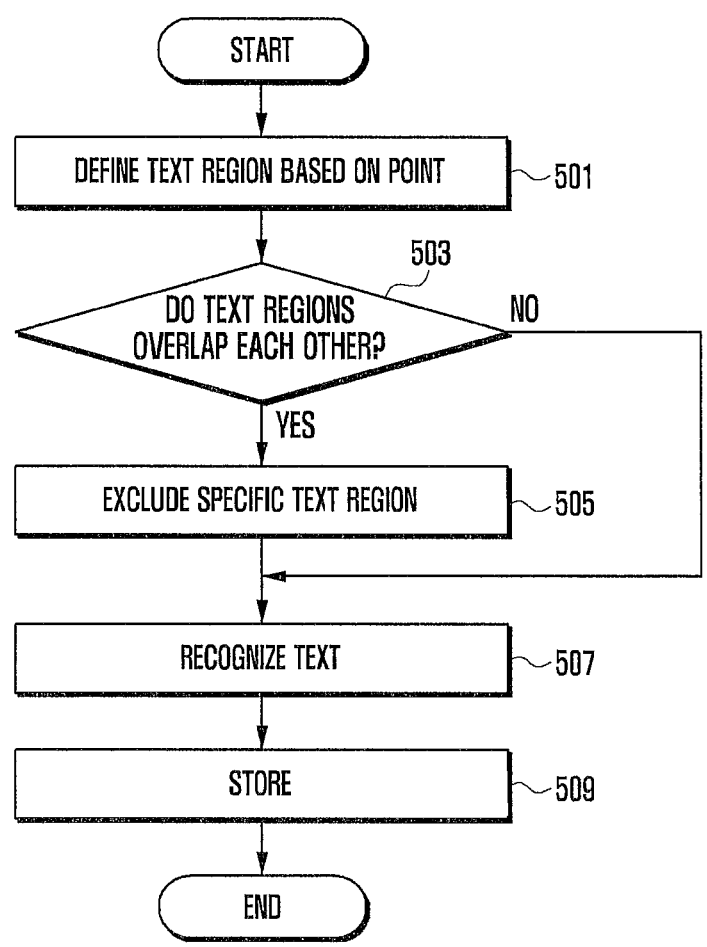
FIG. 5 illustrates a method of recognizing handwriting text in accordance with an embodiment of the present disclosure.

FIG. 5 is illustrates a method of recognizing handwriting text in accordance with an embodiment of the present disclosure. Prior to a description, an image that can be recognized to be text with reference to the recognition of handwriting text can have been inputted.

Referring to FIG. 5, in the method of recognizing handwriting text in accordance with an embodiment of the present disclosure, for example, the control module 160 can perform the recognition of text regions based on point information at operation 501. For example, the control module 160 can classify at least one stroke, including in images output to the display module 140, as each text region using pieces of information about points and pieces of information about the disposition of strokes. In accordance with an embodiment, the control module 160 can define a square region including pieces of point information. In accordance with another embodiment, the control module 160 can define a free looped curve region in accordance with the form of a stroke based on point information and stroke disposition information.

When the text region of each stroke is defined, for example, the control module 160 can check whether or not the text regions overlap each other at operation 503. In this process, the control module 160 can collect information about the coordinates of each text region. Furthermore, the control module 160 can perform comparison on the pieces of information about the coordinates of the text regions, and can check whether or not overlapping text regions are present. If, as a result of the check at operation 503, the text regions are found to not overlap each other, the control module 160 can skip operation 505, and can perform the text recognition function at operation 507.

If, as a result of the check at operation 503, the text regions are found to overlap each other, for example, the control module 160 can perform control so that a specific text region is excluded at operation 505. In accordance with an embodiment, the control module 160 can calculate the width of each text region using the information about the coordinates of the text region. The control module 160 can calculate the mean value of the calculated widths. The control module 160 can select text regions, having a difference of a predetermined and specific size or more, based on the mean value. The control module 160 can exclude the selected text regions.

In accordance with an embodiment, the control module 160 can compute a distribution of the widths of the text regions. In this process, the control module 160 can define text regions, having a similar width range within a specific range, as a group. The control module 160 can exclude a text region that belongs to a group whose number of individuals is relatively small or whose number of individuals is a specific number or less.

In accordance with an embodiment, the control module 160 can exclude at least one specific text region by setting and selecting a candidate. For example, the control module 160 can calculate the mean value of the sizes of strokes or the mean value of the widths of text regions in which the strokes are disposed, and can extract a stroke, having a predetermined and specific size difference or more as compared with the mean value, or a text region, including the stroke, as an exclusion candidate group. The control module 160 can detect the overlap ratio of a stroke extracted as a candidate or an exclusion candidate group including the stroke. In this process, the control module 160 can define the overlap ratio as 0.0~1.0, for example, and can select an additional exclusion candidate group having an overlap ratio that is equal to or higher than or lower than a predetermined threshold value A. Furthermore, the control module 160 can determine a stroke that belongs to additional exclusion candidates having a specific overlap ratio and that exceeds a predetermined threshold value B to be an unnecessary stroke, and can exclude the unnecessary stroke.

In the process of checking the overlap ratio, the control module 160 may not perform the operations related to the threshold value A and the threshold value B in multiple stages, but can exclude a specific stroke using only the threshold value A. For example, the threshold value A can be a predetermined overlap size, and the threshold value B can be the number of overlapping strokes or a predetermined number of overlapping text regions. The control module 160 can perform control so that strokes extracted through the aforementioned process are not transferred to a text recognition engine by excluding the extracted strokes.

At operation 507, for example, the control module 160 can control the text recognition of the remaining text regions other than the excluded strokes or the text regions including the excluded strokes. The control module 160 can perform text recognition on a stroke disposed in a text region using the text recognition DB 153 that has been previously stored and the text recognition engine.

At operation 509, for example, the control module 160 can control the storage of the handwriting information including the recognized text. The control module 160 can form the recognized text and the handwriting information into a single page or different pages, and can store the single page or different pages in the handwriting information DB 151.

Figure 6:
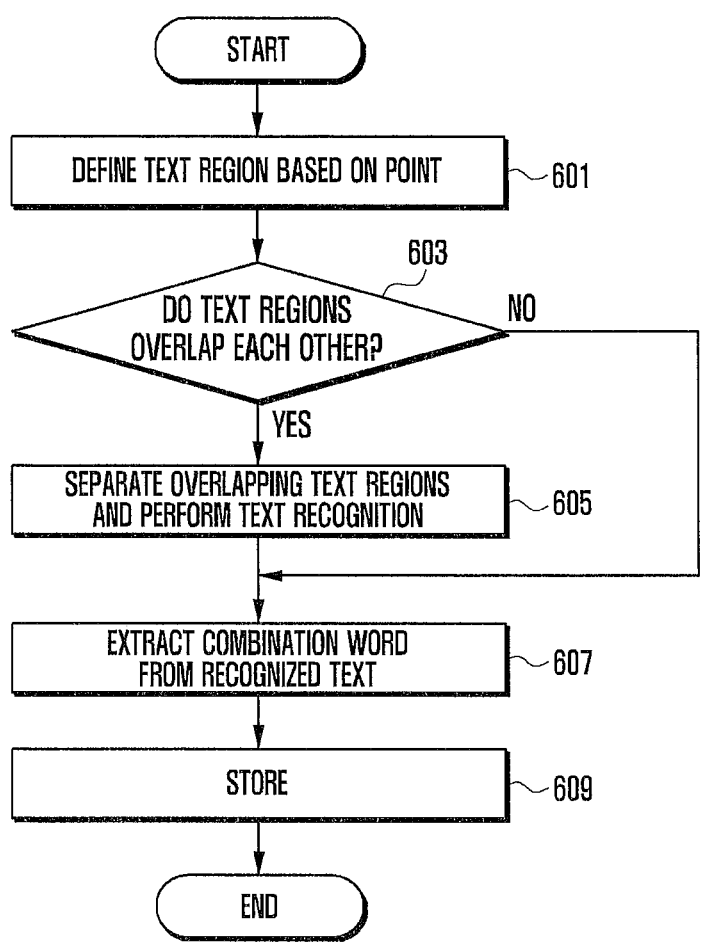
FIG. 6 illustrates a method of recognizing handwriting text in accordance with another embodiment of the present disclosure.

FIG. 6 is a diagram illustrating a method of recognizing handwriting text in accordance with another embodiment of the present disclosure.

Referring to FIG. 6, in the method of recognizing handwriting text in accordance with another embodiment of the present disclosure, the control module 160 can perform the recognition of text regions based on information about points at operation 601. The control module 160 can separate images, output to the display module 140, into strokes based on point information and stroke disposition information. The control module 160 can define areas of a specific shape, including pieces of information about points included in the strokes, as text regions.

When the text regions are defined, for example, the control module 160 can check whether or not the text regions overlap each other at operation 603. The control module 160 can check pieces of information about the coordinates of text regions of the strokes, and can check whether or not overlap text regions are present in the pieces of information about the coordinates at operation 603. If, as a result of the check at operation 603, the text regions are found to not overlap each other, the control module 160 can skip operation 605, and can branch to operation 607 in which the control module 160 can perform control so that subsequent processes are performed.

If, as a result of the check at operation 603, the text regions are found to overlap each other, the control module 160 can perform text separation and recognition on the overlapping text regions at operation 605. In accordance with an embodiment, the control module 160 can exclude text regions from the overlapping text regions depending on the number of cases where overlap is not generated. For example, if four text regions are present and two of the four text regions overlap each other, the control module 160 can exclude one of the two overlapping text regions from each of the two overlapping text regions, and can perform text recognition on the remaining text regions.

In accordance with various embodiments, the control module 160 can control the exclusion of the overlapping text regions based on the time when the strokes included in the text regions were written. Alternatively, the control module 160 can control the exclusion of the overlapping text regions based on the locations where the overlapping text regions are disposed. In this case, the control module 160 can perform text recognition on the remaining text regions while alternately performing the exclusion of the text regions.

At operation 607, the control module 160 can perform the extraction of a combination word on pieces of recognized text. The control module 160 can perform the extraction of the combination word on the pieces of recognized text using the text recognition DB 153. At operation 609, the control module 160 can perform control so that the handwriting information, the pieces of recognized text, and information about the combination word are stored.

The method of operating electronic handwriting in accordance with various embodiments of the present disclosure can include a process of checking the overlap of at least some stokes in information about an entered or stored stroke, a process of selecting at least some of the overlapping strokes as a specific group, and a recognition process of performing text recognition on the strokes based on the selected specific group. In this case, whether which region of stroke information will be selected as the specific group, whether or not to exclude the selected specific group and to perform text recognition on the remaining groups, or whether or not to perform text recognition on the selected specific group can be performed selectively or entirely as described above in connection with the aforementioned various embodiments.

Accordingly, in accordance with various embodiments, the method of operating electronic handwriting according to the present disclosure can include at least one of a process of excluding at least some of pieces of overlapping stroke information from a specific group and performing text recognition on the remaining pieces of stroke information and a process of performing text recognition on the pieces of excluded stroke information.

In accordance with various embodiments, the method of operating electronic handwriting can include a process of outputting at least some of the results of text recognition performed on pieces of information about excluded strokes as a result of text recognition performed on information from which pieces of information about overlapping strokes have been excluded.

Figure 7:
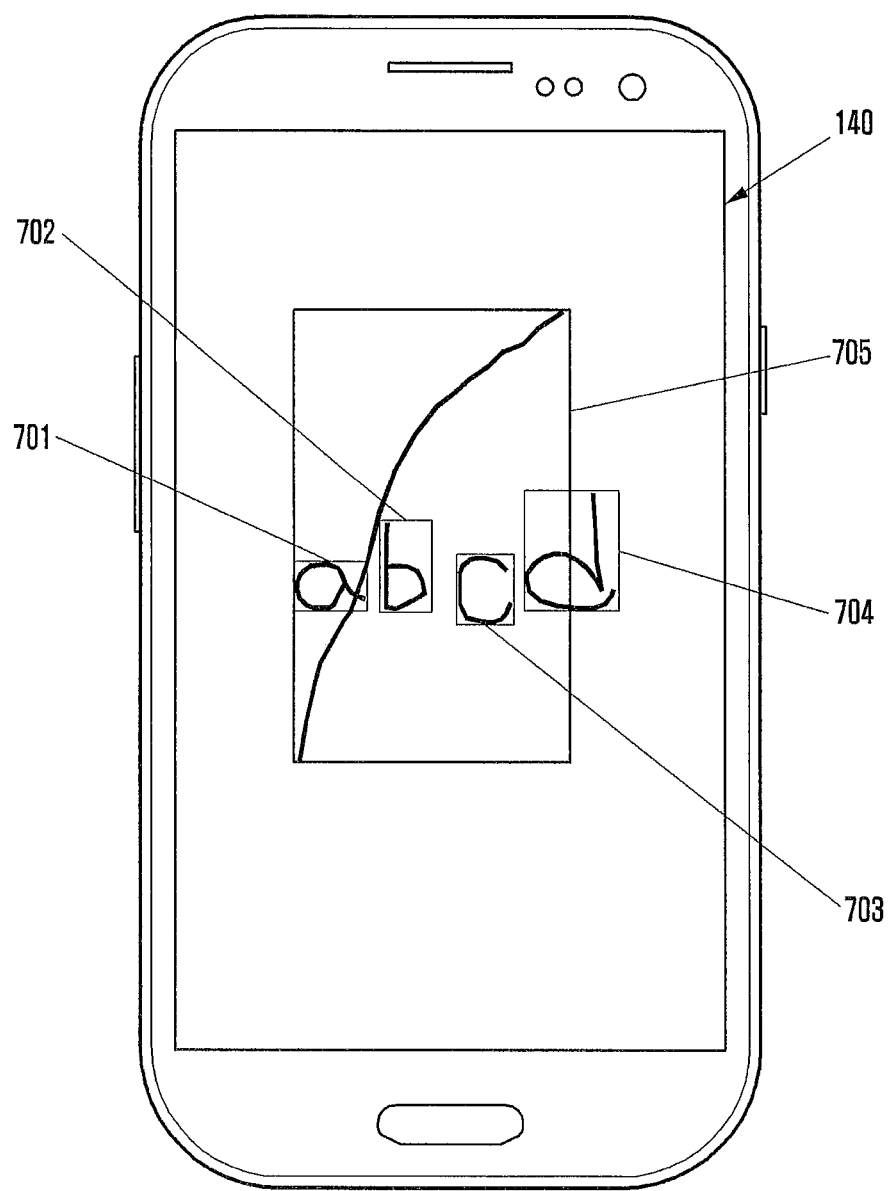
FIG. 7 illustrates the recognition of handwriting text in accordance with an embodiment of the present disclosure.

FIG. 7 is a diagram illustrating the recognition of handwriting text in accordance with an embodiment of the present disclosure.

Referring to FIG. 7, when five strokes are drawn by the handwriting means 201, 202 as shown on the display module 140, the control module 160 can check the size of each of the strokes or the size of each text region corresponding to the respective strokes, for example, text regions 701, 702, 703, 704, and 705. In the following description, checking the size of each of the text regions 701, 702, 703, 704, and 705 corresponding to the strokes is illustrated and described. The text regions 701, 702, 703, 704, and 705 corresponding to the strokes can be defined based on pieces of information on the points of the strokes as described above. Alternatively, the text regions 701, 702, 703, 704, and 705 can be defined based on pieces of information about the points of the strokes and information about the disposition of the strokes.

In FIG. 7, the control module 160 can define the text regions 701, 702, 703, 704, and 705 corresponding to respective strokes "a, b, c, d, and /". For example, each of the text regions 701, 702, 703, 704, and 705 can be defined a square including the stroke. In this case, the square can be controlled depending on a change in the design method.

When the text regions 701, 702, 703, 704, and 705 are defined, the control module 160 can calculate the mean value of the text regions 701, 702, 703, 704, and 705. Furthermore, the control module 160 can exclude a specific text region having a difference of a predetermined and specific value or more from the mean value, for example, the large text region 705 in text recognition, or can select the large text region 705 as an exclusion candidate group. Alternatively, the control module 160 can exclude the text region 705 having a difference of a specific size or more between the text regions in text recognition, or can select the text region 705 as an exclusion candidate group.

If the process of selecting a candidate group is performed, the control module 160 can select a stroke(s) to be excluded in text recognition in a next process based on the overlap ratio of the text region 705 that has been selected to belong to the exclusion candidate group.

If a stroke to be excluded in text recognition in a next process is determined based on the overlap ratio, the text region 701 overlaps with the text region 705. The text region 702 overlaps with the text region 705. The text region 703 overlaps with the text region 705. Some portion of the text region 704 overlaps with the text region 705. That is, the text region 705 fully overlaps with the first to the third text regions 701, 702, and 703, and overlaps with part of the text region 704. The control module 160 can exclude the text region 705 based on its overlap ratio or the number of overlapped texts. For example, if the overlap ratio with other text regions is equal to or more than a threshold, then the control module 160 can remove the stroke. In some embodiments, the number of other texts overlapping the text region of a stroke is equal to or more than a threshold, then the control module 160 can remove the stroke.

In accordance with an embodiment, if each of the text region 704 and the text region 705 has an error ratio or more as compared with a predetermined mean value, the text region 704 and the text region 705 can be selected as an exclusion candidate group. The control module 160 can check the overlap ratio of the text region 704. If only part of the text region 704 overlaps with the text region 705, the control module 160 can process the text region 704 as a text region for text recognition in accordance with a predetermined rule. Furthermore, the control module 160 can exclude only the text region 705 in the text recognition.

Figure 8:
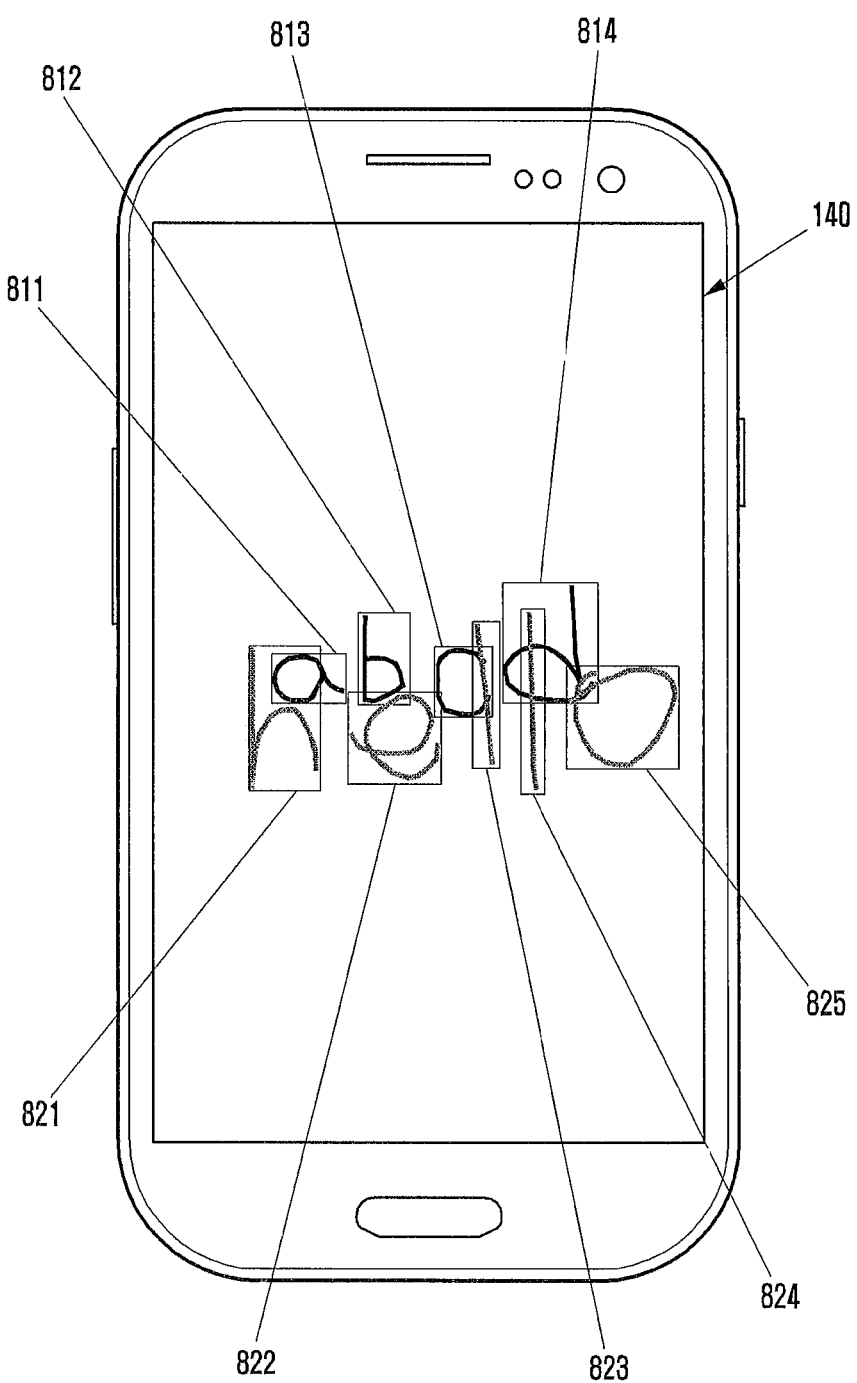
FIG. 8 illustrates the recognition of handwriting text in accordance with another embodiment of the present disclosure.

FIG. 8 illustrates the recognition of handwriting text in accordance with another embodiment of the present disclosure.

Referring to FIG. 8, when 9 strokes are drawn by the handwriting means 201, 202 as shown in the display module 140, the control module 160 can check the size of each of the strokes or text regions 811, 812, 813, 814, 821, 822, 823, 824, and 825 corresponding to the respective strokes. The text regions corresponding to the strokes can be defined based on pieces of information about the points of the strokes as described above. Alternatively, the text regions can be defined based on pieces of information about the points of the strokes and information about the disposition of the strokes.

The control module 160 can check the size of each of the text regions 811, 812, 813, 814, 821, 822, 823, 824, and 825 and the mean value of the sizes. The control module 160 can select a text region that has a specific error range or more between the size of the text region and the mean value. In this process, in FIG. 8, the control module 160 can determine an error of the text regions corresponding to the nine strokes to be a predetermined and specific range or less. The control module 160 may not select a stroke or text region to be excluded in text recognition based on the mean value.

The control module 160 can determine the overlap ratios of each text regions. In FIG. 8, the text region 811 overlaps with the text region 821. The text region 822 overlaps with the text region 812 and the text region 813. The text region 823 overlaps with the text region 813. The text region 814 overlaps with the text region 824 and the text region 825. The control module 160 can check the time when the text regions were written. For example, the control module 160 can check that after the text regions 811, 812, 813, and 814 of the first group are written, the text regions 821, 822, 823, 824, and 825 of the second group were written after a lapse of a specific time interval. The control module 160 can preferentially remove the text regions 821, 822, 823, 824, and 825 of the second group from the text regions of the first group. The control module 160 can perform text recognition on the text regions 811, 812, 813, and 814 of the first group. After performing the text recognition on the text regions of the first group, the control module 160 can remove the text regions 811, 812, 813, and 814 of the first group from the text regions of the second group. The control module 160 can perform text recognition on the text regions 821, 822, 823, 824, and 825 of the second group. In FIG. 8, the control module 160 can recognize text corresponding to "abcd," and text corresponding to "hello." The control module 160 can perform control so that the results of text recognition performed on the handwriting information output to the display module 140 are stored in the storage module 150.

If the text regions do not overlap each other, the control module 160 can perform control so that text recognition is performed on each of the text regions. Furthermore, in the above description, the control module 160 has been illustrated as calculating the mean value and error values of the text regions, but various embodiments of the present disclosure is not limited thereto. For example, the control module 160 may not calculate the mean value and error values, but can perform control so that text recognition is performed on each of the text regions output to the display module 140 after overlapping text regions are excluded.

In the above description, the text regions of the second group have been illustrated as being excluded depending on the state in which all the text regions of the second group overlap with the text regions of the first group, but the present disclosure is not limited thereto. For example, if the text region 821 to the text region 825 have been consecutively written within a specific time, the control module 160 can consider the stroke of a text region that belongs to the text regions of the second group, but does not overlap with the text regions of the first group to belong to the text regions of the second group. The control module 160 can recognize the text regions 821, 822, 823, 824, and 825 of the second group as a single word based on time information in a process of performing text recognition on text regions that do not overlap each other. For example, although the text region 822 and the text region 823 do not overlap with the text region 812 and the text region 813, the control module 160 can exclude all the text regions of the second group in a process of performing text recognition on the text regions of the first group based on information about the time when the overlapped text regions 821, 824, and 825 were written. Furthermore, although some text regions do not overlap each other, the control module 160 can exclude all the text regions of the first group based on information about the time when the strokes were written in a process of performing text recognition on the text regions of the second group. For example, the control module 160 can check information about the time when the strokes were written, and can perform control so that strokes consecutively written within a specific time are processed in a single text recognition process. In this process, if some of the strokes consecutively written overlap each other, the control module 160 can process a process of excluding overlapped strokes along with strokes that do not overlap each other.

Meanwhile, the aforementioned electronic device can further include various and additional modules depending on the type of electronic device. That is, if the electronic device is a communication device, the electronic device can further include elements not described above, such as a short-range communication module for short-range communication, an interface for the transmission and reception of data of the electronic device using a wired communication method or a wireless communication method, an Internet communication module for performing an Internet function through communication with the Internet, and a digital broadcasting module for performing a function of receiving and playing back digital broadcasting. The elements may not be all enumerated because they are modified in various ways according to the convergence trend of digital devices, but elements equivalent to the aforementioned elements can be further added to the electronic device. Furthermore, it is to be noted that some of the elements included in the construction of the electronic device of the present disclosure can be omitted or can be replaced with other elements. This may be easily understood by those skilled in the art.

As described above, the electronic handwriting function in accordance with various embodiments of the present disclosure can provide support so that an error of text recognition is minimized and more reliable and improved text recognition is performed because it can adaptively perform processing on pieces of overlapping text.

Various embodiments disclosed provide support so that the usability of the electronic handwriting function can be improved.

For example, various embodiments disclosed herein provide support so that an error of text recognition in the electronic handwriting function can be minimized and the accuracy of text recognition can be improved.

Various embodiments disclosed herein provide support so that information desired to be input by a user can be input more accurately.

Various embodiments disclosed herein provide support so that an information search for pieces of information written by the electronic handwriting function can be performed more accurately.

Some exemplary embodiments of the present disclosure have been described through the specification and drawings. Although specific terms have been used, the terms are merely used as common meanings in order to easily describe the technical contents of the present disclosure and to help understanding of the present disclosure, but are not intended to limit the scope of the present disclosure. That is, it will be evident to those skilled in the art to the present disclosure pertains that various other embodiments based on the technical spirit of the present disclosure may be implemented.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of recognizing handwriting, comprising:
receiving at least two handwriting strokes from a touch screen;
determining text regions corresponding to respective the at least two handwriting strokes;
calculating each size of the text regions;
determining whether the text regions overlap each other;
selecting a specific text region among the text regions into an excluding strokes group based on at least one of the size of the specific text region, a ratio of an overlap region between the specific text region and other text regions to the specific text region, and a number of overlap regions between the specific text region and the other text regions; and
recognizing characters of the text regions except for the excluding strokes group.

2. The method of claim 1, further comprising:
calculating a mean value of sizes of the text regions, and a difference value between the sizes of the respective text regions and the mean value of sizes of the text regions;
when a difference value corresponding the specific text region is greater than a predetermined threshold, selecting the specific text region into the excluding strokes group.

3. The method of claim 1, further comprising:
selecting part of the handwriting strokes and excluding remaining some of the strokes in response to a user input.

4. The method of claim 1, wherein the respective text regions is a square region containing a point information of handwriting stroke.

5. The method of claim 1, further comprising:
calculating the number of overlap regions between the specific text region and other text regions;
when the number of overlap regions corresponding the specific text region is greater than a predetermined threshold, selecting the specific text region into the excluding strokes group.

6. The method of claim 1, further comprising:
calculating the ratio of an overlap region between a specific text region and other text regions to the specific text region;
when the ratio of an overlap region corresponding the specific text region is greater than a predetermined threshold, selecting the specific text region into the excluding strokes group.

7. The method of claim 1, further comprising storing results of the text recognition along with handwriting information corresponding to an image input by the handwriting.

8. The method of claim 1, further comprising:
obtaining time information on when overlapped handwriting strokes are written; and
grouping the overlapped handwriting strokes based on the time information.

9. The method of claim 8, further comprising:
recognizing a characters of the overlapped handwriting strokes sequentially on the group basis.

10. An electronic device for recognizing handwriting, comprising:
at least one of a touch device configured to receive a handwriting strokes;
a storage configured to store information comprising the at least one handwriting stroke; and
a controller configured to:
determine text regions corresponding to at least two handwriting strokes,
calculate each size of text regions,
determine whether the text regions overlap each other,
select a specific text region among the text regions into an excluding strokes group based on at least one of the size of the specific text region, a ratio of an overlap region between the specific text region and other text regions to the specific text region, and a number of overlap regions between the specific text region and other text regions, and
recognize characters of the text regions except for the excluding strokes group.

11. The electronic device of claim 10, wherein the controller is configured to:
calculate a mean value of sizes of the text regions, and a difference value between the sizes of the respective text regions and the mean value of sizes of the text regions;
when a difference value corresponding the specific text region is greater than a predetermined threshold, select the specific text region into the excluding strokes group.

12. The electronic device of claim 10, wherein the controller is configured to:
selecting part of the handwriting strokes in response to a user input; and
exclude remaining part of the handwriting strokes.

13. The electronic device of claim 10, wherein the respective text regions is a square region containing a point information of handwriting stroke.

14. The electronic device of claim 13, wherein the controller is configured to:
- calculate the number of overlap regions between the specific text region and other text regions;
- when the number of overlap regions corresponding the specific text region is greater than a predetermined threshold, select the specific text region into the excluding strokes group.

15. The electronic device of claim 13, wherein the controller is configured to:
- calculate the ratio of an overlap region between a specific text region and other text regions to the specific text region;
- when the ratio of an overlap region corresponding the specific text region is greater than a predetermined threshold, select the specific text region into the excluding strokes group.

16. The electronic device of claim 10, wherein the storage is configured to store results of the text recognition along with handwriting information corresponding to an image input by the handwriting.

17. The electronic device of claim 10, wherein the controller is configured to:
- obtain time information on when overlapped handwriting strokes are written; and
- group the overlapped handwriting strokes based on the time information.

* * * * *